United States Patent [19]

Braun et al.

[11] Patent Number: 4,744,177
[45] Date of Patent: May 17, 1988

[54] VIBRATORY ABRADER

[75] Inventors: Roland Braun, Winnenden; Bernd Kaiser, Hohengehren; Siegfried Stämmele, Leutenbach, all of Fed. Rep. of Germany

[73] Assignee: Licentia Patent-Verwaltungs-GmbH, Frankfurt, Fed. Rep. of Germany

[21] Appl. No.: 865,723

[22] PCT Filed: Aug. 23, 1985

[86] PCT No.: PCT/DE85/00285
§ 371 Date: Jun. 6, 1986
§ 102(e) Date: Jun. 6, 1986

[87] PCT Pub. No.: WO86/01761
PCT Pub. Date: Mar. 27, 1986

[30] Foreign Application Priority Data

Sep. 8, 1984 [DE] Fed. Rep. of Germany ....... 3433094
May 17, 1985 [DE] Fed. Rep. of Germany ....... 3517766

[51] Int. Cl.⁴ .................................................. B24B 23/04
[52] U.S. Cl. ............................................... 51/170 MT
[58] Field of Search ........ 51/170 MT, 170 TL, 170 R

[56] References Cited

U.S. PATENT DOCUMENTS 1,445,857  2/1923  Stevens .
3,533,193 10/1970  Dudek et al. ................. 51/170 MT
3,874,125  4/1975  Stroezel ....................... 51/170 MT

FOREIGN PATENT DOCUMENTS 2006466 10/1971 Fed. Rep. of Germany .
3518984 11/1986 Fed. Rep. of Germany ........ 51/170 MT
2223964 10/1974 France .

Primary Examiner—Roscoe V. Parker
Attorney, Agent, or Firm—Spencer & Frank

[57] ABSTRACT

A vibratory abrader having a grinding plate which is supported at the housing by way of elastic elements, with the abrading plate being put into an orbital movement by way of a ball bearing attached to an eccentric drive member which is equipped with a compensating weight and can be caused to rotate by the armature shaft of the drive motor. To be able to make such a vibratory grinder usable for rough as well as fine abrader work by simply changing the eccentric stroke of the abrading plate, the eccentric drive member is driven by means of an eccentric pin which is likewise mounted eccentrically with respect to the axis of the armature shaft and the armature shaft is pivotal relative to the eccentric drive member and its compensating weight, with the angle of rotation between the armature shaft and the eccentric drive member in both directions being limited to 180° by corresponding abutments at the armature shaft and at the eccentric drive member, and an additional compensating weight is associated with the compensating weight of the eccentric drive member, with this additional compensating weight likewise being rotatable about 180° relative to the compensating weight.

14 Claims, 4 Drawing Sheets

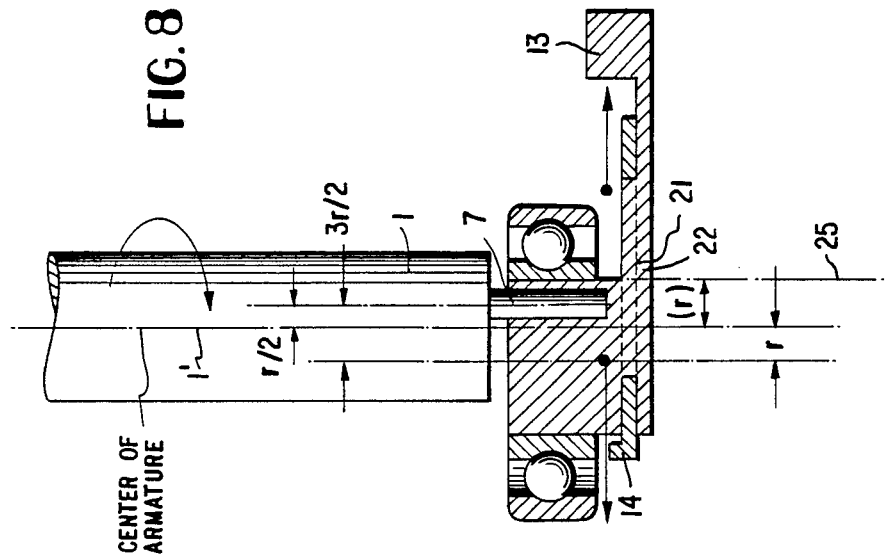
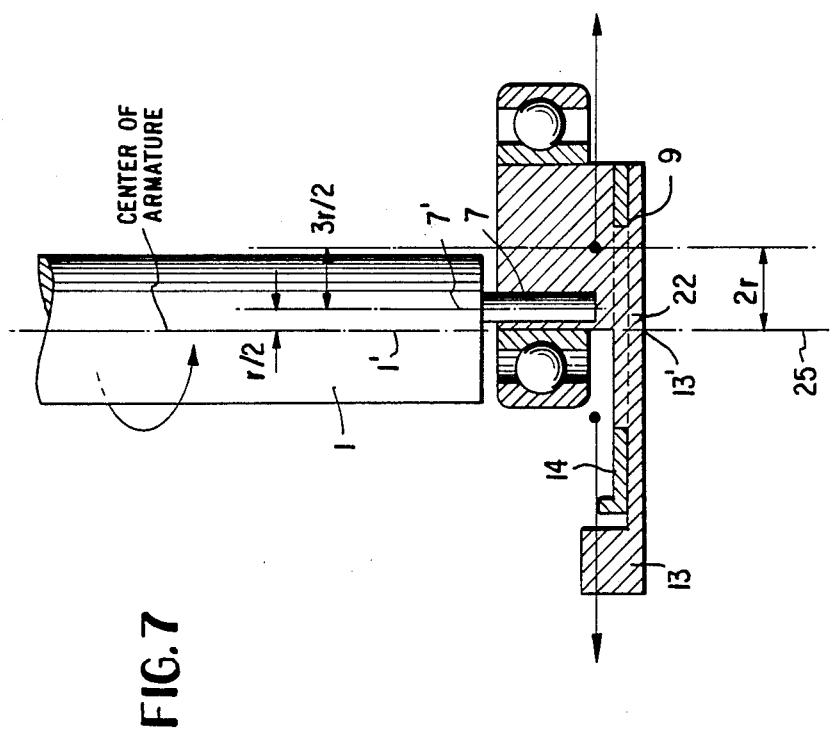

VIBRATORY ABRADER

BACKGROUND OF THE INVENTION

1. Field of the Invention

The invention relates to a vibratory or oscillatory sander grinder or abrader having a grinding plate which is supported at the housing by way of elastic elements, with the grinding or abrading plate being put into an orbital movement by way of a ball bearing attached to an eccentric drive member which is equipped with a compensating weight and can be caused to rotate by the armature shaft of the drive motor.

2. The Prior Art

In known vibratory grinders or oscillating sanders of this type, the eccentric drive member including its compensating weight is fixed to the armature shaft of the drive motor. The swing of the eccentric drive member is here defined and unchangeable. For that reason and depending on the design of its eccentric swing and possibly its number of revolutions, such a vibratory grinder is suitable either specifically for rough grinding (abrading) work or preferably for fine grinding work. Therefore, two vibratory grinders with generally different eccentricities and numbers of revolutions are used for rough and fine grinding work.

SUMMARY OF THE INVENTION

It is the object of the invention to provide a vibratory abrader such as a vibratory grinder which, by simply changing its eccentric stroke, is suitable to the same degree for rough as well as fine grinding work.

This is accomplished according to the invention in that the eccentric drive member is drive by means of an eccentric pin which is likewise mounted eccentrically with respect to the axis of the armature shaft and the armature shaft is pivotal relative to the eccentric drive member and its compensating weight, with the angle of rotation between the armature shaft and the eccentric drive member in both directions being limited to 180° by corresponding abutments at the armature shaft and at the eccentric drive member, and an additional compensating weight is associated with the compensating weight of the eccentric drive member, with this additional compensating weight likewise being rotatable about 180° relative to the compensating weight.

Modifications and suitable features of the invention are defined in the dependent claims.

BRIEF DESCRIPTION OF THE DRAWINGS

The invention will be described below with reference to the drawings which depicts preferred embodiments.

The embodiments are shown in:

FIG. 7, a detail view, partially in section, of the armature shaft with the eccentric pin and the eccentric drive member during rotation of the armature shaft to the left and;

FIG. 8, a detail view corresponding to FIG. 7, but with the armature shaft moving to the right.

DESCRIPTION OF THE PREFERRED EMBODIMENT

Figure 1:
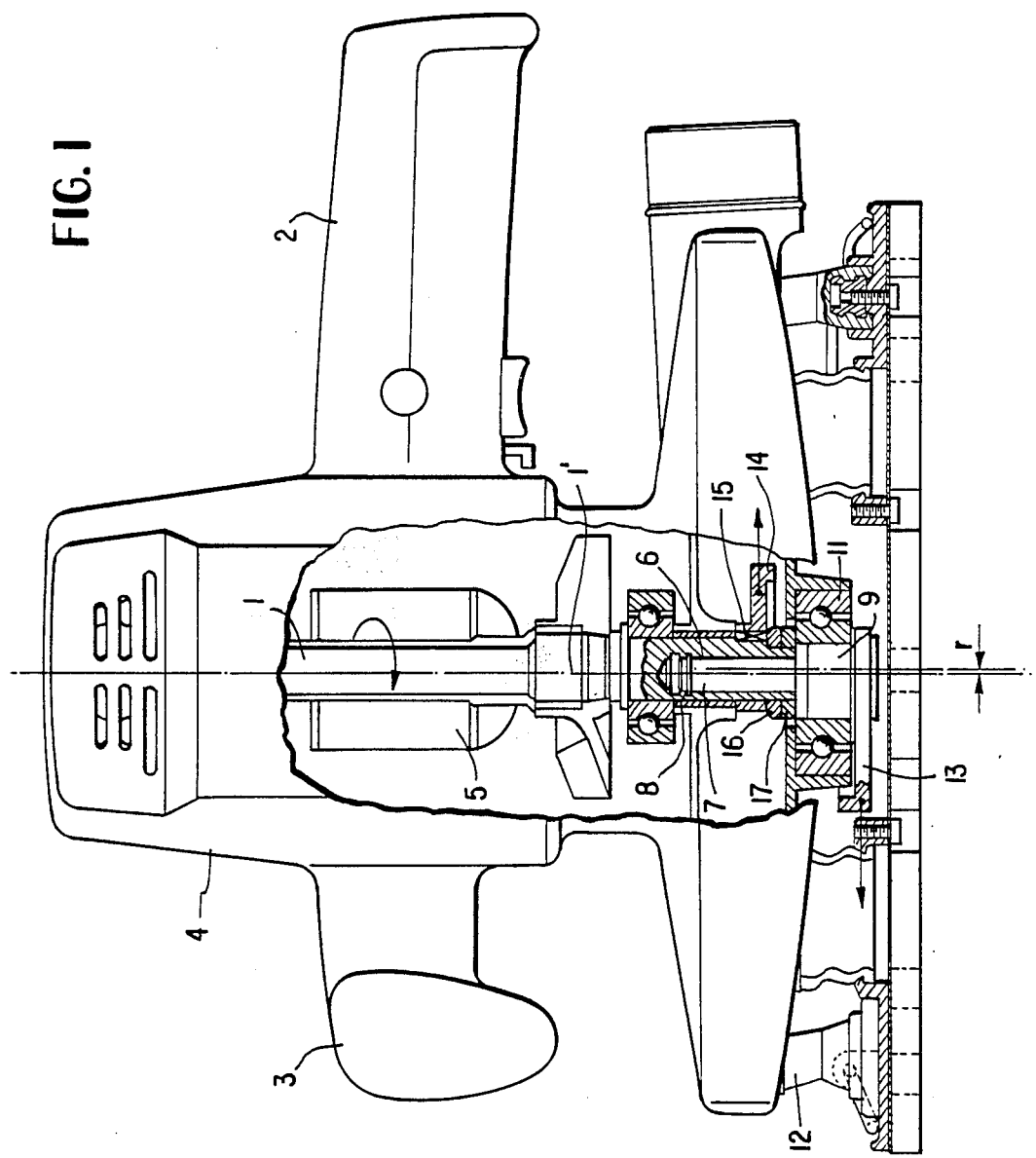
FIG. 1, a side view, partially in section, of a vibratory grinder in which the eccentricity "r" of the eccentric drive member is defined by the position of the armature shaft relative to the eccentric drive member and the compensating weight.
Figure 4:
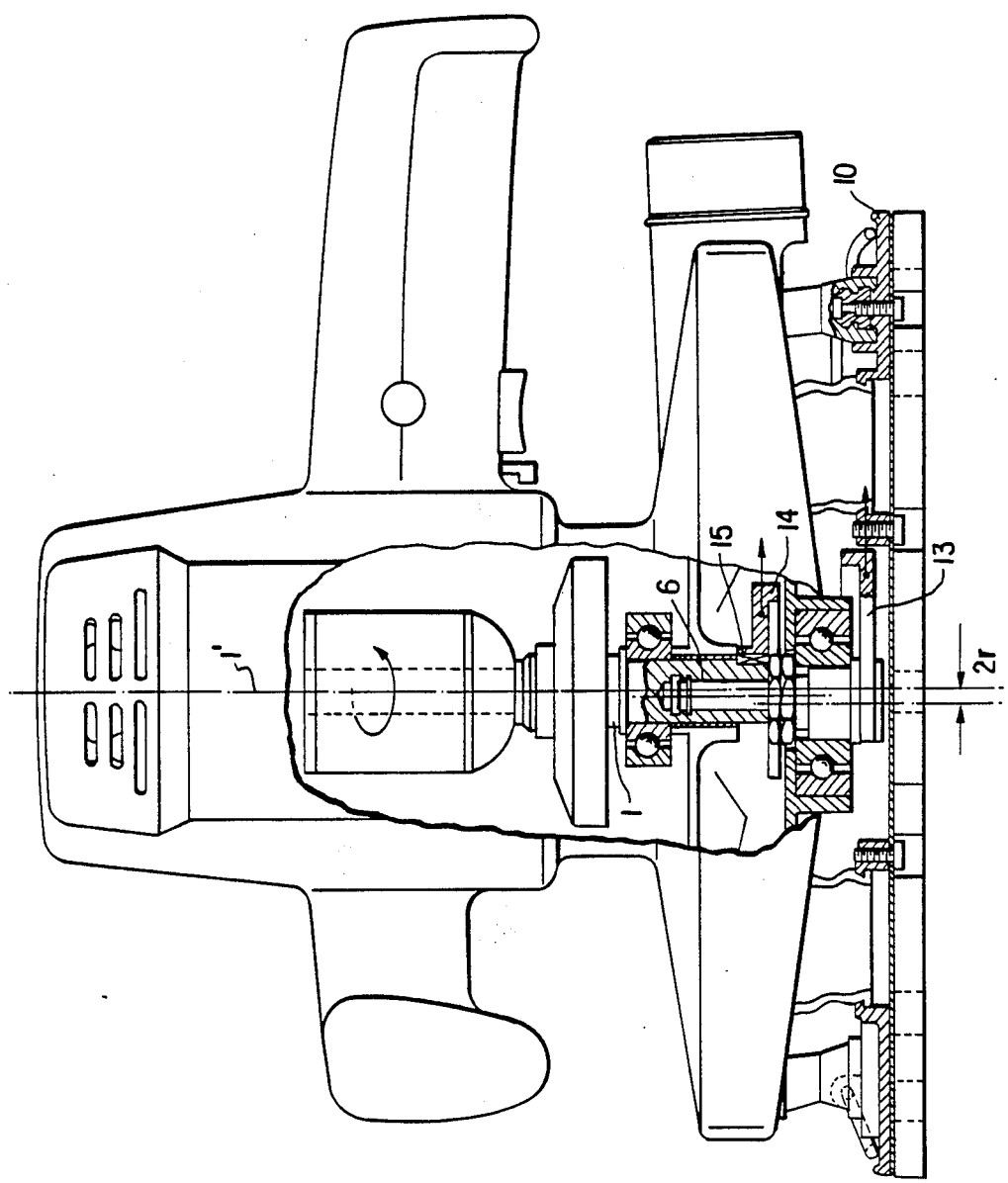
FIG. 4, a side view of the vibratory grinder corresponding to FIG. 1, but with an eccentric drive member compensating weight unit which is rotated by 180° with respect to the eccentric shaft.

As can be seen in FIGS. 1 and 4, the drive motor 5 is disposed vertically in a vibratory grinder housing 4 which is equipped with a handle 2 and a handhold 3. The armature shaft 1 of the motor has a bore 6 which is eccentric to its longitudinal axis 1' and an eccentric pin 7 is rotatably mounted in this bore so as to be secure against axial displacement. The securing of the eccentric pin against falling out of the bore 6 in the armature shaft may here be realized by a circlip 8 or a similar element.

A grinding plate 10 is mounted on eccentric drive member 9 so as to be rotatable by means of a ball bearing 11, with the rotary movement of the eccentric drive member 9 being converted to orbital movement of the grinding plate with the aid of elastic supporting elements 12 which are mechanically coupled with the grinding plate and with the housing of the vibratory grinder. To compensate for the imbalanced mass generated during the conversion of the rotary movement of the armature shaft to orbital movement of the grinding plate, eccentric drive member 9 is provided with a compensating weight 13.

An additional compensating weight 14 is attached to armature shaft 1 so as to be secure against rotation, for example by means of a wedge connection 15. To secure additional compensating weight 14 against axial displacement, a nut 16 and counternut 17 are provided which are screwed to an external thread provided on the armature shaft. The additional compensating weight 14 has a mass ratio of 1/2:3/2 to compensating weight 13.

Figure 3:
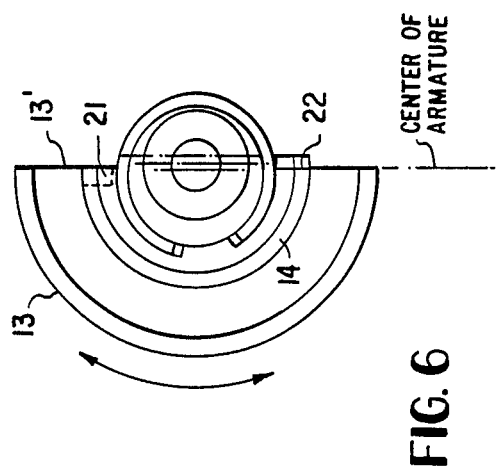
FIG. 3, a view of the lower portion of the armature shaft and its abutment which limits the rotary position of the eccentric drive member relative to the armature shaft.
Figure 2:
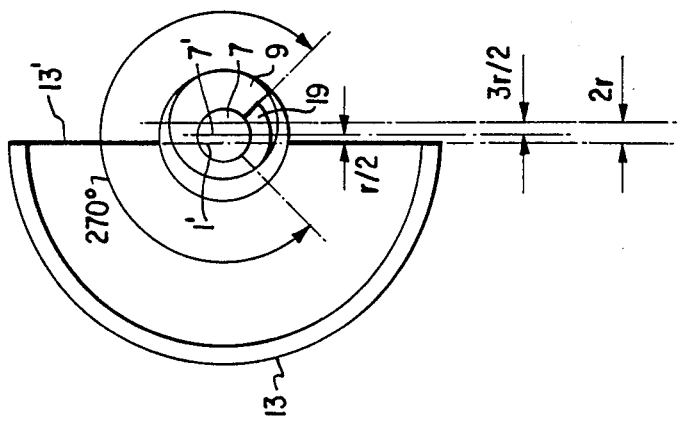
FIG. 2, a top view of the compensating weight.

The relative rotatability of the two compensating weights 13 and 14 is limited to 180° by an abutment 19 at the eccenytric drive member 9 and a projection 20 at the frontal face of the armature shaft 1 (see FIGS. 2 and 3).

As can be seen in FIG. 2, the eccentricity of the eccentric pin 7 with respect to the longitudinal axis 1' of the armature shaft is r/2 and the eccentricity of the eccentric drive member 9 with respect to the longitudinal axis of the armature shaft is 2r, thus with respect to the longitudinal axis 7' of the eccentric pin, it is 3r/2. That means that in one case (FIG. 1, movement of the armature shaft to the right) a total eccentricity of 3r/2−r/2=r results, while in the other case (FIG. 4, movement of the armature shaft to the left), due to the 180° rotation of the armature shaft relative to the eccentric drive member and vice versa, the total eccentricity is 3r/2+r/2=2r.

In the position of rotation to the right shown in FIG. 1, the additional compensating weight 14 works counter to compensating weight 13, so that the compensation of masses according to the eccentricity is MA=3/2−1/2=1.

This operating state is provided for fine grinding work. During rotation to the left, the armature shaft and the additional compensating weight 14 rotate by 180° relative to compensating weight 13 and eccentric drive member 9 around eccentric pin 7 and vice versa, with the eccentricity of the eccentric bore 6 in the armature shaft being doubled; thus a total eccentricity of 2r is realized. This operating state is shown in FIG. 4. The additional compensating weight 14 now is oriented in the direction of compensating weight 13 so that the masses are added: $M_A = 3/2 + 1/2 = 2$.

While in the latter case, the compensating mass axis is identical with the axis of the armature shaft, if the armature shaft rotates to the right, the compensating mass axis shifts with respect to the armature shaft axis by the amount r. It has been found that this shaft is practically negligible. If necessary, however, a suitable compensation can be made.

Figure 6:
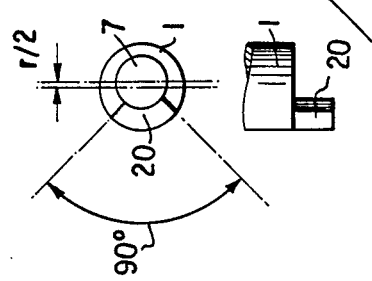
FIG. 6, a top view of the eccentric of FIG. 5.
Figure 5:
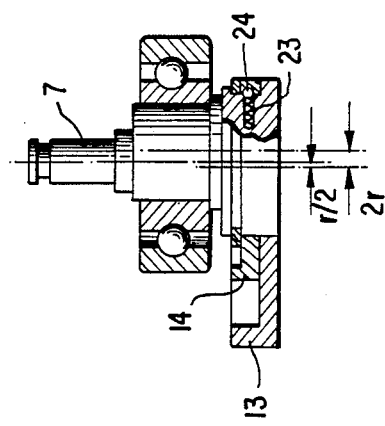
FIG. 5, a side view of the eccentric drive member where the additional compensating weight is rotatably mounted in the additional weight of the eccentric drive member.

As shown in FIGS. 5 and 6, the additional compensating weight 14 may also be mounted so as to be rotatable in compensating weight 13. In this case, an abutment 22 of the additional compensating weight 14 limits the relative movement of the two compensating weights with respect to one another to 180°. If the armature shaft rotates to the right, the additional compensating weight 14 moves until it comes to rest against a recess 21 in frontal face 13' of the compensating weight 13.

The mass of additional compensating weight 14 is here subtracted from the mass of compensating weight 13. If movement is to the left, the additional compensating weight 14 is rotated by 180° so that the two masses are added together. In this case, abutment 22 of the additional compensating weight runs onto frontal face 13' of compensating weight 13.

To prevent relative movement of the two compensating weights with respect to one another during motor speed variation, a spherical detent 23, 24 is provided on the two compensating weights to fix the position of the compensating weights.

The mass compensating weights are designed in such a manner that the resulting compensating force lies at least approximately in the plane of the center of gravity of the vibrating parts so that the free moments are compensated.

Reversal of direction is effected electrically by means of right/left switching. Likewise, a reduction of rpm for a larger stroke is effected electronically when the vibratory grinder is switched to rotation to the left.

In the case of FIGS. 7 and 8, eccentric pin 7 is a component of armature shaft 1. FIG. 7 here illustrates the left moving position of eccentric pin 7 with its eccentricity r/2 and the eccentric drive member 9 with is eccentricity 3r/2 with respect to axis 7' of the eccentric pin, so that, with respect to armature shaft 1', the resulting eccentricity is 2r. FIG. 7 also shows the position of compensating weight 13 and of the additional compensating weight 14 which rests on compensating weight 13 and is rotatable about the major eccentric. The axis of the two compensating masses is here identical with the armature shaft axis 1. Reference numeral 13' identifies the frontal face of compensating weight 13.

The position of these components while moving to the right is shown in FIG. 8. The resulting eccentricity is here $3r/2 - r/2 = r$. The axis of the compensating mass is also offset by this amount with respect to armature shaft axis 1.

We claim:

1. A vibratory abrader, comprising:
   a housing;
   an abrading plate;
   elastic elements elasticly connecting said abrading plate to said housing; and
   means for driving said abrading plate in orbital motion with respect to said housing, said driving means including
   a drive motor having an armature shaft driven by said motor in rotation about an armature axis,
   an eccentric pin having a pin axis, mounted to said armature shaft eccentrically with respect to said armature axis,
   an eccentric drive member eccentrically disposed with respect to said armature axis and said pin axis so as to be eccentrically rotated with respect to said armature axis by said eccentric pin with rotation of said armature shaft and said eccentric pin therewith about said armature axis,
   a ball bearing on said housing connected to said eccentric drive member so as to transmit eccentric movement of said eccentric drive member to said abrading plate through said bearing, said housing and said elastic elements, and
   a compensating weight on said eccentric drive member;
   said armature shaft and said eccentric drive member being swivelable relative to each other about pin axis, said armature shaft and said eccentric drive member having respective abutments thereon limiting the relative swivel movement of said armature shaft and said eccentric drive member to 180° between a first position adopted during rotation of said armature shaft in a first direction, in which the eccentricity of said eccentric drive member with respect to said armature axis is the sum of the eccentricity of said eccentric drive member with respect to said pin axis and the eccentricity of said eccentric pin with respect to said armature axis so that the eccentric drive member has an enlarged eccentric swing, and a second position adopted during rotation of said armature shaft in a second direction opposite said first direction, in which the eccentricity of said eccentricity drive member with respect to said armature axis is the difference between the eccentricity of said eccentric drive member with respect to said pin axis and the eccentricity of said eccentric pin with respect to said armature axis so that the eccentric drive member has a reduced eccentric swing.

2. Vibratory abrader as in claim 1, wherein said armature shaft has a longitudinal bore which is eccentric to said armature axis, said eccentric pin and said eccentric drive member therewith being rotatable in said bore and secured against axial displacement therein.

3. Vibratory abrader as in claim 1, wherein designating the eccentricity of said eccentric drive member with respect to said armature axis as r, the eccentricity of said eccentric pin with respect to said armature axis is r/2 and the eccentricity of said eccentric drive member with respect to said pin axis is 3r/2.

4. A vibratory abrader as in claim 1, further comprising an additional compensating weight associated with the compensating weight rotatable relative to the compensating weight on said eccentric drive member 180° between opposite end positions.

5. A vibratory abrader as in claim 4, wherein said additional compensating weight is fixed to said armature shaft.

6. A vibratory abrader as in claim 4, wherein said additional compensating weight is rotatably mounted in said compensating weight on said eccentric drive member and the relative rotation between the two compensating weights is limited to 180° by an abutment.

7. A vibratory abrader as in claim 6, wherein said abutment is formed on one of the two compensating weights.

8. A vibratory abrader as in claim 6, further comprising a detent device for automatically releasably fixing said additional compensating weight at said opposite end positions.

9. A vibratory abrader as in claim 8, wherein said detent device is mounted on the two compensating weights.

10. A vibratory abrader as in claim 4, wherein said additional compensating weight is attached to said armature shaft and the compensating weight of said eccentric drive member and said additional compensating weight have a mass ratio of 3/2 to 1/2.

11. A vibratory abrader as in claim 1, wherein the eccentric swing of said eccentric drive member changes automatically when the direction of rotation of said vibratory abrader is switched.

12. A vibratory grinder as in claim 11, wherein when the direction of rotation of said armature shaft is changed from said second direction to said first direction, the rate of rotation of said armature shaft is automatically reduced.

13. A vibratory abrader as in claim 11, wherein the eccentric swing of the eccentric drive member increases during the change in the direction of said armature shaft from said second direction to said first direction and decreases during the change in the direction of said armature shaft from said first direction to said second direction.

14. Vibratory grinder according to claim 1 wherein the eccentric pin is a component of the armature shaft and is rotatably mounted in the eccentric drive member.

* * * * *